(12) United States Patent
Yokota

(10) Patent No.: US 9,179,389 B2
(45) Date of Patent: Nov. 3, 2015

(54) RADIO TERMINAL, INFORMATION PROCESSING DEVICE, INFORMATION PROCESSING PROGRAM, AND INFORMATION PROCESSING METHOD

(75) Inventor: Tomoyoshi Yokota, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1205 days.

(21) Appl. No.: 12/667,011

(22) PCT Filed: Jun. 27, 2008

(86) PCT No.: PCT/JP2008/061741
§ 371 (c)(1),
(2), (4) Date: Feb. 22, 2010

(87) PCT Pub. No.: WO2009/001930
PCT Pub. Date: Dec. 31, 2008

(65) Prior Publication Data
US 2010/0208705 A1    Aug. 19, 2010

(30) Foreign Application Priority Data

Jun. 28, 2007    (JP) ................................. 2007-171068

(51) Int. Cl.
*H04W 4/00*    (2009.01)
*H04W 36/36*    (2009.01)

(52) U.S. Cl.
CPC ..................................... *H04W 36/36* (2013.01)

(58) Field of Classification Search
CPC ...................................................... H04W 36/36
USPC ................................................ 370/331, 332
See application file for complete search history.

(56) References Cited

U.S. PATENT DOCUMENTS

| 2006/0140150 A1* | 6/2006 | Olvera-Hernandez et al. | 370/331 |
| 2010/0208705 A1* | 8/2010 | Yokota | 370/332 |

FOREIGN PATENT DOCUMENTS

| JP | 2004-304399 | 10/2004 |
| JP | 2005-109722 | 4/2005 |
| JP | 2006-310973 | 11/2006 |

OTHER PUBLICATIONS

Notification of Reason(s) for Refusal (including translation) for JP 2007-171068, mailed Jun. 19, 2012, 6 pages.
IEEE P802.21/D04.00 Draft Standard for Local and Metropolitan Area Networks: Media Independent Handover Services, Feb. 2007.
International Search Report for PCT/JP2008/061741, mailed on Sep. 30, 2008, 1 page.

* cited by examiner

*Primary Examiner* — Shripal Khajuria
*Assistant Examiner* — Farhad Ali
(74) *Attorney, Agent, or Firm* — Duane Morris LLP

(57) ABSTRACT

A radio terminal (10) includes: an MIH user (14) for managing mobility from a first network to a second network; and an MIH function unit (13) for controlling handover from the first network to the second network. The MIH function unit (13) notifies a link control unit (12) of a condition setting request including a first judgment local formula as a condition for starting setting of the second network and the radio link and a second judgment logical formula as a condition executing a handover from the first network to the second network. The first judgment logical formula and the second judgment logical formula indicates a combination of threshold values to be satisfied by a plurality of radio parameters in the first network and the established radio link.

9 Claims, 6 Drawing Sheets

| Name | Type | Description |
|---|---|---|
| TYPE OF LINK PARAMETER (Link Parameter Type) | A pair of {Link Type : Parameter Type} Examples: {Generic SINR}, {Generic RSSI}, {EV-DO : DRC}, {EV-DO : Tx_Power}, {EV-DO : DRC_Lock}, | LINK PARAMETERS FOR WHICH THRESHOLDS ARE SET UP |
| FIRST THRESHOLD (Initiate Action Threshold) | THRESHOLD SET UP FOR EACH LINK PARAMETER | USED FOR JUDGMENT TO START PREPARATION FOR HANDOVER (Initiation Action) |
| THIRD THRESHOLD (Rollback Action Threshold) | THRESHOLD SET UP FOR EACH LINK PARAMETER | USED FOR JUDGMENT TO CANCEL PREPARATION FOR HANDOVER (Initiation Action) |
| SECOND THRESHOLD (Execute Action Threshold) | THRESHOLD SET UP FOR EACH LINK PARAMETERS | USED FOR JUDGMENT TO START EXECUTION OF HANDOVER (Execute Action) |
| FIRST JUDGMENT LOGICAL FORMULA | LOGICAL FORMULA CONCERNING PREPARATION FOR HANDOVER (Initiation Action) | "Link_Parameters_Report. indication" IS NOTIFIED TO MIH FUNCTION UNIT WHEN FIRST JUDGMENT LOGICAL FORMULA IS SATISFIED |
| SECOND JUDGMENT LOGICAL FORMULA | LOGICAL FORMULA CONCERNING EXECUTION OF HANDOVER (Execute Action) | "Link_Parameters_Report. indication" IS NOTIFIED TO MIH FUNCTION UNIT WHEN SECOND JUDGMENT LOGICAL FORMULA IS SATISFIED |
| JUDGMENT CYCLE (Interval for judgment) | JUDGMENT TIME (Interval time) | INDICATES JUDGMENT CYCLE OF JUDGMENT LOGICAL FORMULA |

FIG. 3

| | FIRST NETWORK (e.g. CDMA 1x EV-DO) | SECOND NETWORK (e.g. IEEE 802.16e) | THIRD NETWORK (e.g. WLAN) |
|---|---|---|---|
| LINK PARAMETERS | {SINR, RSSI, DRC, Tx_Power, DRC_Lock} | {SINR, RSSI, Successful ratio of DL-MAP receive, Rate, Uplink Modulation class, Tx_Power} | {CIR, RSSI, PER, Rate} |
| THRESHOLDS (Initiate Action) | {0dB, -80dBm, 6, 15dBm, 0.8} | {3dB, -70dBm, 0.9, 500kbps, QPSK 3/4, 15dBm} | {3dB, -75dBm, 0.1, 500kbps} |
| THRESHOLDS (Execute Action) | {-5dB, -90dBm, 4, 23dBm, 0.8} | {-2dB, -80dBm, 0.8, 200kbps, QPSK 1/2, 23dBm} | {0dB, -85dBm, 0.1, 500kbps} |
| FIRST JUDGMENT LOGICAL FORMULA (Initiate Action) | (SINR & RSSI & DRC) \|\| (Tx_Power & DRC_Lock) | (SINR & RSSI & Successful ratio of DL-MAP receive) \|\| Tx_Power & Uplink Modulation class | (CIR & PER) \| RSSI |
| SECOND JUDGMENT LOGICAL FORMULA (Execute Action) | (SINR & RSSI & DRC) \|\| (Tx_Power & DRC_Lock) | (SINR & RSSI & Successful ratio of DL-MAP receive) \|\| Tx_Power & Uplink Modulation class | (CIR & PER) \| RSSI |

FIG. 5

| Name | Type | Description |
|---|---|---|
| TYPE OF LINK PARAMETER (Link Parameter Type) | A pair of {Link Type : Parameter Type}<br>Examples :<br>{Generic SINR},<br>{Generic RSSI},<br>{EV-DO : DRC},<br>{EV-DO : Tx_Power},<br>{EV-DO : DRC_Lock}, | LINK PARAMETERS FOR WHICH THRESHOLDS ARE SET UP |
| FIRST THRESHOLD (Initiate Action Threshold) | THRESHOLD SET UP FOR EACH LINK PARAMETER | USED FOR JUDGMENT TO START PREPARATION FOR HANDOVER (Initiation Action) |
| THIRD THRESHOLD (Rollback Action Threshold) | THRESHOLD SET UP FOR EACH LINK PARAMETER | USED FOR JUDGMENT TO CANCEL PREPARATION FOR HANDOVER (Initiation Action) |
| SECOND THRESHOLD (Execute Action Threshold) | THRESHOLD SET UP FOR EACH LINK PARAMETERS | USED FOR JUDGMENT TO START EXECUTION OF HANDOVER (Execute Action) |
| FIRST JUDGMENT LOGICAL FORMULA | LOGICAL FORMULA CONCERNING PREPARATION FOR HANDOVER (Initiation Action) | "Link_Parameters_Report.indication" IS NOTIFIED TO MIH FUNCTION UNIT WHEN FIRST JUDGMENT LOGICAL FORMULA IS SATISFIED |
| SECOND JUDGMENT LOGICAL FORMULA | LOGICAL FORMULA CONCERNING EXECUTION OF HANDOVER (Execute Action) | "Link_Parameters_Report.indication" IS NOTIFIED TO MIH FUNCTION UNIT WHEN SECOND JUDGMENT LOGICAL FORMULA IS SATISFIED |
| JUDGMENT CYCLE (Interval for judgment) | JUDGMENT TIME (Interval time) | INDICATES JUDGMENT CYCLE OF JUDGMENT LOGICAL FORMULA |

FIG. 6

| Name | Type | Description |
|---|---|---|
| OLD LINK PARAMETER VALUE | VALUE OF EACH LINK PARAMETER | VALUE OF OLD LINK PARAMETER |
| NEW LINK PARAMETER VALUE | VALUE OF EACH LINK PARAMETER | VALUE OF NEW LINK PARAMETER |
| OPERATION TYPE | INTEGER | 1: PREPARATION FOR HANDOVER (Initiate Action)<br>2: EXECUTION OF HANDOVER (Execute Action) |
| JUDGMENT LOGICAL FORMULA | JUDGMENT LOGICAL FORMULA | LOGICAL FORMULA USED FOR QoS JUDGMENT |

RADIO TERMINAL, INFORMATION PROCESSING DEVICE, INFORMATION PROCESSING PROGRAM, AND INFORMATION PROCESSING METHOD

CROSS-REFERENCE TO RELATED APPLICATIONS

This is a U.S. National Phase Application of International Application No. PCT/JP2008/061741 filed Jun. 27, 2008, which claims priority to Japanese Patent Application No. 2007-171068 filed Jun. 28, 2007, the disclosures of which are incorporated herein by reference in their entirety.

TECHNICAL FIELD

The present invention relates to a radio terminal, an information processing device, an information processing program, and an information processing method which are configured to perform a handover from a first network to a second network employing a radio communication scheme different from that of the first network.

BACKGROUND ART

There has heretofore been known a radio terminal connectable to multiple networks employing different radio communication schemes (including "1xEV-DO" in compliance with CDMA2000 and "WiMAX" in compliance with IEEE802.16e, for example).

The radio terminal includes a mobility manager (MIH user; Media Independent Handover User) configured to manage mobility between the multiple networks, and multiple link controllers configured to respectively control radio links which are established between its own terminal and the respective networks. Moreover, there is a proposal to provide a handover controller (MIHF; Media Independent Handover Function) which is located between the mobility manager and the multiple link controllers, and which is configured to control handovers between the multiple networks (Non-patent Document 1, for example).

To be more precise, the mobility manager notifies the handover controller of types of multiple link parameters (SINR, RSSI, DRC, Tx_Power, and DRC_Lock, for example) and information (MIH_Configure.request) indicating multiple thresholds set up for the respective link parameters. Here, the thresholds include a first threshold (Initiate Action Threshold) for judging whether or not to perform preparation for a handover (Initiation Action), a second threshold (Execute Action Threshold) for judging whether or not to execute the handover (Execute Action), and a third is threshold (Rollback Action Threshold) for judging whether or not to cancel preparation for the handover (Rollback Action).

The handover controller notifies the link controller, which controls the radio links already established, of information (Link_Configure_Threshold.request) indicating the types of the multiple link parameters and the multiple thresholds set up for each of the link parameters.

The link controller notifies the handover controller of information (Link_Parameters_Report.indication) indicating a link parameter value when the link parameter value becomes worse than the first threshold. The handover controller notifies the mobility manager of information (MIH_Link_Parameters_Report.indication) indicating the link parameter value.

Based on this notice, the mobility manager instructs preparation of a handover, i.e., an establishment of the radio link which is yet to be established.

Subsequently, the link controller notifies the handover controller of the information (Link_Parameters_Report.indication) indicating the link parameter value when the link parameter value becomes worse than the second threshold (a value representing a situation where a radio environment becomes worse than that of the first threshold). The handover controller notifies the mobility manager of the information (MIH_Link_Parameters_Report.indication) indicating the respective link parameter values.

Based on this notice, the mobility manager instructs execution of the handover, i.e., switching of the network to which the radio terminal is connected.

In the meantime, the link controller notifies the handover controller of the information (Link_Parameters_Report.indication) indicating the link parameter value when the link parameter value becomes better than the third threshold. The handover controller instructs cancellation of the preparation for the handover (Initiation Action).

As described above, since the link controller only has to perform threshold judgment, a process load on the link controller is reduced.

Non-patent Document 1: IEEE802.21 Draft Standard (P802.21/D04.00)

DISCLOSURE OF THE INVENTION

According to the above-described background art, the link controller simply notifies the handover controller of the information (Link_Parameters_Report.indication) indicating the link parameter value individually for each of the link parameters when the link parameter becomes worse than the thresholds (the first threshold and the second threshold).

Accordingly, when the link parameter value (the radio environment) is changed within a period from the preparation for the handover (Initiation Action) to the execution of the handover, the handover controller is frequently notified of the information (Link_Parameters_Report.indication) indicating the link parameter value. In other words, a process load on the handover controller is increased.

In the meantime, in order to prevent frequent cancellation of the preparation for the handover (Initiation Action), it is not preferable to set the third threshold to the value equal to the first threshold. Therefore, in order to provide a hysteresis, it is a general practice to set the third threshold to a value in a situation where the radio environment becomes better than that of the first threshold.

Accordingly, even if the link parameter actually becomes better than the first threshold, the preparation for the handover (Initiation Action) may not be cancelled in some cases depending on transmission timing of the information (Link_Parameters_Report.indication) indicating the link parameter value. In other words, even if the link parameter value is actually recovered, execution of the handover (Execute Action) may be erroneously judged.

Therefore, it is an objective of the present invention to provide a radio terminal, an information processing device, an information processing program, and an information processing method, which are capable of reducing messages from a link controller to a handover controller and preventing erroneous judgment of handovers.

In one characteristic of the present invention, a radio terminal configured to perform a handover from a first network to a second network employing a radio communication scheme different from that of the first network, comprising: a first link controller (for example, link controller 12A) configured to establish a radio link with the first network; a second link controller (for example, link controller 12B) configured to establish a radio link with the second network; a mobility manager (MIH user 14) configured to manage mobility from the first network to the second network; and a handover controller (MIH function unit 13) configured to control the handover from the first network to the second network, wherein the mobility manager notifies the handover controller of a threshold setting request for requesting a set-up of a threshold for a link parameter to be monitored in the radio link established with the first network, in response to the threshold setting request, the handover controller notifies the first link controller of a condition setting request including a first condition being a condition to start an establishment of a radio link with the second network and a second condition being a condition to execute the handover from the first network to the second network, the first condition indicates a combination of thresholds to be satisfied by a plurality of link parameters in the radio link established with the first network, and the second condition indicates a combination of thresholds to be satisfied by the plurality of link parameters in the radio link established with the first network.

According to this characteristic, the handover controller notifies the first link controller of the first condition and the second condition representing the combinations of the thresholds to be satisfied by the multiple link parameters.

Therefore, the first link controller does not have to notify the handover controller individually of the information indicating the link parameter values every time the respective link parameters exceed the thresholds, thereby reducing messages from the first link controller to the handover controller.

Moreover, since the first link controller grasps the combinations of the thresholds to be satisfied by the multiple link parameters, it is possible to perform a handover operation properly without depending upon transmission timing of the information indicating the link parameter values and thereby to suppress erroneous judgment of handovers.

In the aforementioned characteristic of the present invention, the condition setting request may include a cycle for judging whether or not the first condition is satisfied; and a cycle for judging whether or not the second condition is satisfied.

In one characteristic of the present invention, an information processing device comprising: a mobility manager configured to manage mobility from a first network to a second network employing a radio communication scheme different from that of the first network; and a handover controller configured to control a handover from the first network to the second network, wherein the mobility manager notifies the handover controller of a threshold setting request for requesting a set-up of a threshold for a link parameter to be monitored in a radio link established with the first network, in response to the threshold setting request, the handover controller notifies a first link controller configured to establish a radio link with the first network, of a condition setting request including a first condition being a condition to start an establishment of a radio link with the second network and a second condition being a condition to execute the handover from the first network to the second network, the first condition indicates a combination of thresholds to be satisfied by a plurality of link parameters in the radio link established with the first network, and the second condition indicates a combination of thresholds to be satisfied by the plurality of link parameters in the radio link established with the first network.

In one characteristic of the present invention, an information processing program to be applied to an information processing apparatus provided with a mobility manager configured to manage mobility from a first network to a second network employing a radio communication scheme different from that of the first network, and a handover controller configured to control a handover from the first network to the second network, the program causing a computer to execute the steps of: notifying, from the mobility manager to the handover controller, a threshold setting request for requesting a set-up of a threshold for a link parameter to be monitored in a radio link established with the first network; and notifying, from the handover controller to a first link controller configured to establish the radio link with the first network, a condition setting request including a first condition being a condition to start an establishment of a radio link with the second network and a second condition being a condition to execute the handover from the first network to the second network, in response to the threshold setting request, wherein the first condition indicates a combination of thresholds to be satisfied by a plurality of link parameters in the radio link established with the first network, and the second condition indicates a combination of thresholds to be satisfied by the plurality of link parameters in the radio link established with the first network.

In one characteristic of the present invention, an information processing method used in an information processing device provided with an MIH user configured to manage mobility from a first network to a second network employing a radio communication scheme different from that of the first network, and an MIH function unit configured to control a handover from the first network to the second network, the information processing method comprising the steps of: notifying, from the MIH user to the MIH function unit, MIH_Configure.request for requesting a set-up of a threshold for a link parameter to be monitored in a radio link established with the first network; and notifying, from the MIH function unit to a first link controller configured to establish a radio link with the first network, Link_Configure Threshold.request including a first condition being a condition to start an establishment of a radio link with the second network and a second condition being a condition to execute the handover from the first network to the second network, in response to the MIH_Configure.request, wherein the first condition indicates a combination of thresholds to be satisfied by a plurality of link parameters in the radio link established with the first network, and the second condition indicates a combination of thresholds to be satisfied by the plurality of link parameters in the radio link established with the first network.

According to the aspects of the present invention, it is possible to provide a radio terminal, an information processing device, an information processing program, and an information processing method, which are capable of reducing messages from a link controller to a handover controller and suppressing erroneous judgment of handovers.

BRIEF DESCRIPTION OF THE DRAWINGS

FIG. 3 is a view showing information to be managed by an MIH function unit 13 according to the first embodiment.

FIG. 5 is a view showing an example of Link_Configure_Threshold.request according to the first embodiment.

FIG. 6 is a view showing an example of Link_Parameters_Report.indication according to the first embodiment.

BEST MODE FOR CARRYING OUT THE INVENTION

Figure 1:
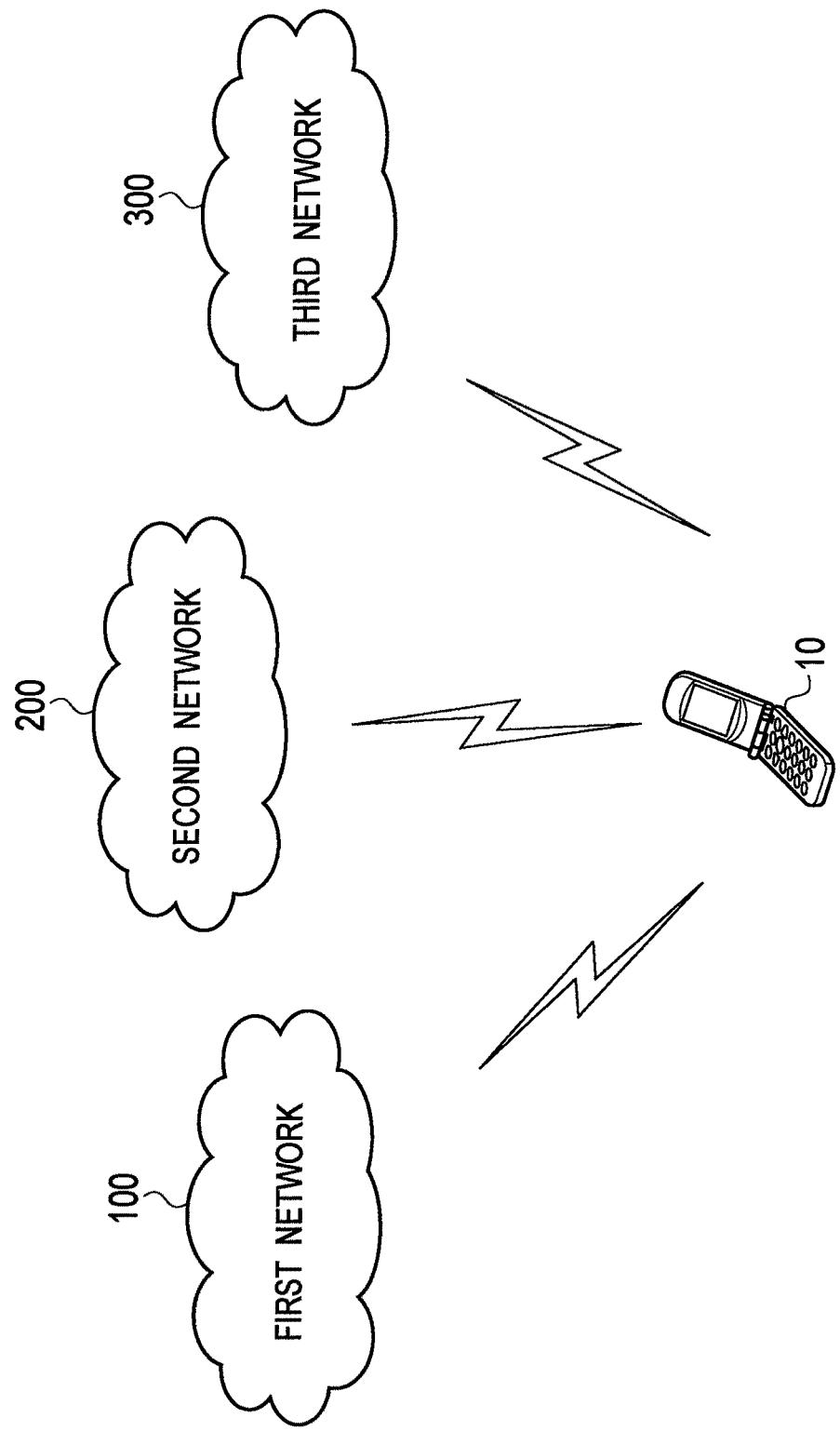
FIG. 1 is a view showing a configuration of a communication system according to a first embodiment.

An embodiment of the present invention will be described below. In the following description of the drawings, identical or similar constituents are designated by identical or similar reference numerals. It is to be noted, however, that the drawings are merely schematic and proportions of respective dimensions and the like may be different from actual ones.

It is therefore to be understood that the actual dimensions and the like should be judged in consideration of the following description. Moreover, it is needless to say that the drawings may also include portions representing dimensional relations and proportions different from one another.

[First Embodiment]
(Configuration of Communication System)

Now, a configuration of a communication system according to a first embodiment will be described below with reference to the accompanying drawing. FIG. 1 is a view showing a configuration of the communication system according to the first embodiment.

As shown in FIG. 1, the communication system includes a radio terminal 10 and multiple networks (a first network 100 to a third network 300).

The radio terminal 10 is the terminal rendered capable of performing radio communication with multiple networks. Note that, details of the radio terminal 10 will be described later.

The multiple networks are the networks employing different radio communication schemes (configurations of physical layers or link layers). For example, the first network 100 is the network employing "1xEV-DO" in compliance with CDMA2000. The second network 200 is the network employing "WiMAX" in compliance with IEEE802.16e. The third network 300 is the network employing "WLAN" in compliance with IEEE802.11.

(Configuration of Radio Terminal)

Figure 2:
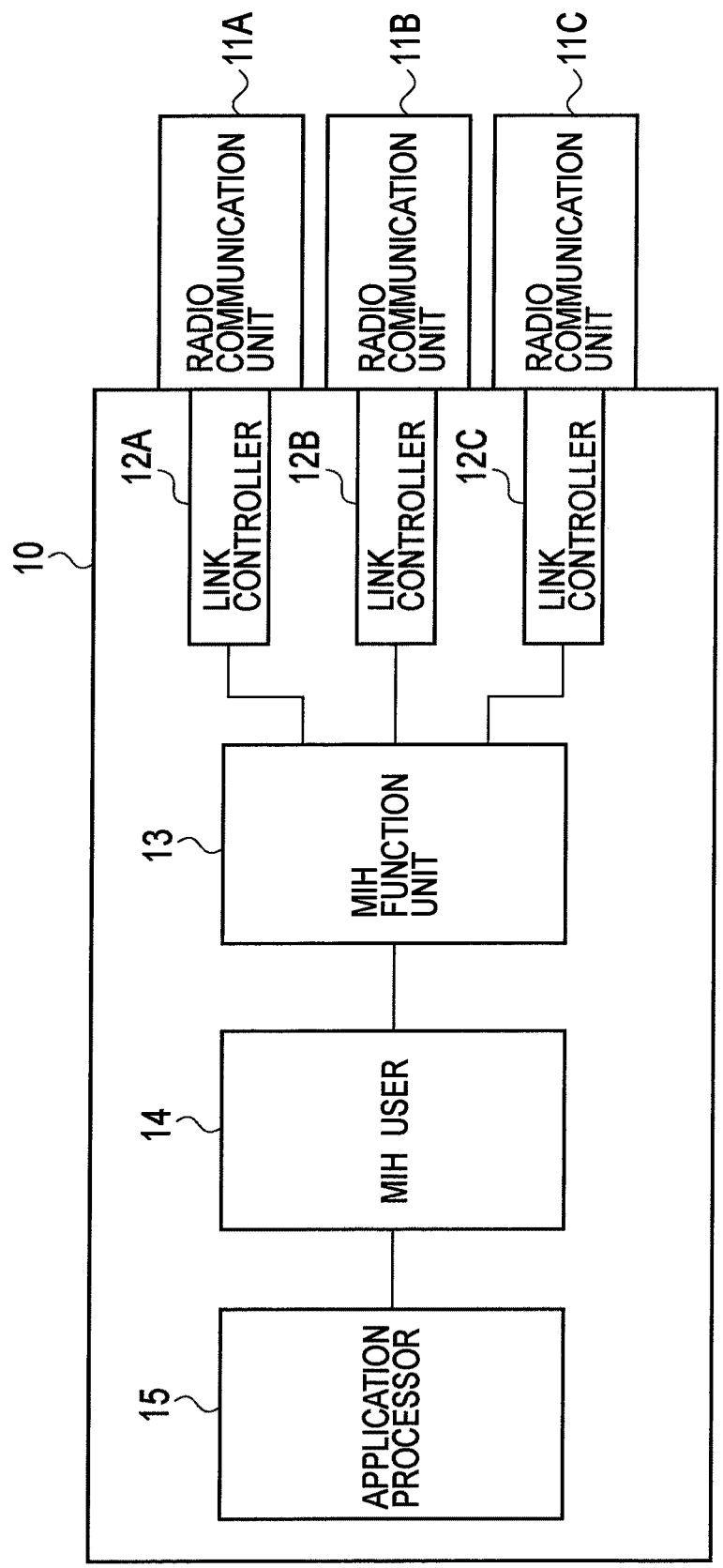
FIG. 2 is a block diagram showing a configuration of a radio terminal 10 according to the first embodiment.

In the following, a configuration of the radio terminal 10 according to the first embodiment will be described with reference to the accompanying drawing. FIG. 2 is a block diagram showing a configuration of the radio terminal 10 according to the first embodiment.

As shown in FIG. 2, the radio terminal 10 includes multiple radio communication units 11 (a radio communication unit 11A to a radio communication unit 11C), multiple link controllers (a link controller 12A to a link controller 12C), an MIH function unit 13, an MIH user 14, and an application processor 15.

The radio communication units 11 establish physical radio connections in physical layers with the respective networks, in response to instructions from an upper layer (such as the application processor 15).

To be more precise, the radio communication unit 11A sets up the physical radio connection corresponding to the "1xEV-DO" with the first network 100. The radio communication unit 11B sets up the physical radio connection corresponding to the "WiMAX" with the second network 200. The radio communication unit 11C sets up the physical radio connection corresponding to the "WLAN" with the third network 300.

The link controllers 12 establish radio links in link layers with the respective networks, in response to instructions from the upper layer (such as the application processor 15). The link controllers 12 monitor respective types of link parameters (Link Parameter) in the radio links established with the respective networks.

To be more precise, the link controller 12A has a function as an interface (a device driver) with the radio communication unit 11A and sets up the radio link corresponding to the "1xEV-DO" with the first network 100. The link controller 12B has a function as an interface (a device driver) with the radio communication unit 11B and sets up the radio link corresponding to the "WiMAX" with the second network 200. The link controller 12C has a function as an interface (a device driver) with the radio communication unit 11C and sets up the radio link corresponding to the "WLAN" with the third network 300.

The MIH function unit 13 is a handover controller configured to control handovers between the networks, in response to an instruction from the MIH user 14 which functions as an upper layer than the MIH function unit 13. The MIH function unit 13 is a media independent handover function that does not depend on the configuration of the physical layer, which is defined in is IEEE802.21.

Here, as shown in FIG. 3, the MIH function unit 13 manages various conditions to perform a handover in the network to which the own terminal is connected. To be more precise, the MIH function unit 13 manages the types of the link parameters, first thresholds (Initiate Action Threshold), second thresholds (Execute Action Threshold), a first judgment logical formula, and a second judgment logical formula in terms of each of the networks.

The type of the link parameter indicates the link parameter to be monitored in the radio link established with the network to which the own terminal is connected.

For example, when the network to which the own terminal is connected is the first network 100, the link parameters shown below are monitored, by the link controller 12A, in the radio link established with the first network 100.

(a) Signal to Interference plus Noise Ratio (SINR)
   (b) Received Signal Strength Indication (RSSI)
   (c) DRC (Data Rate Control)
   (d) Transmission Power (Tx_Power)
   (e) Proportion in which a radio base station normally receives DRC transmitted from a radio terminal (DRC_Lock)

When the network to which the own terminal is connected is the second network 200, the link parameters shown below are monitored, by the link controller 12B, in the radio link established with the second network 200.

(a) Signal to Interference plus Noise Ratio (SINR)
   (b) Received Signal Strength Indication (RSSI)
   (c) Success Rate of DL-MAP Reception (Successful Ratio of DL-MAP Receive)
   (d) Transfer Rate (Rate)
   (e) Uplink Modulation Class (Uplink Modulation Class)
   (f) Transmission Power (Tx_Power)

When the network to which the own terminal is connected is the third network 300, the link parameters shown below are monitored, by the link controller 12C, in the radio link established with the third network 300.

(a) Carrier to Interference Ratio (CIR)
   (b) Received Signal Strength Indication (RSSI)
   (c) Packet Error Rate (PER)
   (d) Transfer Rate (Rate)

The first thresholds (Initiate Action Threshold) are the thresholds set up for the respective link parameters in order to judge whether or not to perform preparation for a handover (Initiation Action). Here, the preparation for the handover is an operation (Initiation Action) to establish a radio link with a different network in a case where a radio link is established with a certain network.

For example, when the network to which the own terminal is connected is the first network 100, the threshold set up for the signal to interface plus noise ratio (SINR) is "0 dB". Similarly, "−80 dBm", "6", "15 dBm", and "0.8" are set up for the rest of the link parameters.

When the network to which the own terminal is connected is the second network 200, the threshold set up for the signal to interface plus noise ratio (SINR) is "3 dB". Similarly, "−70 dBm", "0.9", "500 kbps", "QPSK ¾", and "15 dBm" are set up for the rest of the link parameters.

When the network to which the own terminal is connected is the third network 300, the threshold set up for the carrier to interface ratio (CIR) is "3 dB". Similarly, "−75 dBm", "0.1", and "500 kbps" are set up for the rest of the link parameters.

The second thresholds (Execute Action Threshold) are the thresholds set up for the respective link parameters in order to judge whether or not to perform execution for the handover (Execute Action). Here, the execution for the handover (Execute Action) is an operation to switch the network to which the own terminal is connected in the case where the radio links are established with the certain network and the different network. Here, values representing a situation where a radio environment becomes worse than that of the first threshold (Initiate Action Threshold) are set up for the second thresholds (Execute Action Threshold).

For example, when the network to which the own terminal is connected is the first network 100, the threshold set up for is the signal to interface plus noise ratio (SINR) is "−5 dB". Similarly, "−90 dBm", "4", "23 dBm", and "0.8" are set up for the rest of the link parameters.

When the network to which the own terminal is connected is the second network 200, the threshold set up for the signal to interface plus noise ratio (SINR) is "−2 dB". Similarly, "−80 dBm", "0.8", "200 kbps", "QPSK ½", and "23 dBm" are set up for the rest of the link parameters.

When the network to which the own terminal is connected is the third network 300, the threshold set up for the carrier to interface ratio (CIR) is "0 dB". Similarly, "−85 dBm", "0.1", and "500 kbps" are set up for the rest of the link parameters.

The first judgment logical formula is a condition (a first condition) for performing the preparation for the handover (Initiation Action). To be more precise, the first judgment logical formula indicates a combination of the thresholds to be satisfied by the multiple link parameters in the radio link established with the network to which the own terminal is connected.

For example, when the network to which the own terminal is connected is the first network 100, the preparation for the handover (Initiation Action) is performed if any of the following conditions is satisfied.

(a) All of the SINR, the RSSI, and the DRC become worse is than the first thresholds mentioned above.

(b) All of the Tx_Power and the DRC_Lock become worse than the first thresholds mentioned above.

When the network to which the own terminal is connected is the second network 200, the preparation for the handover (Initiation Action) is performed if any of the following conditions is satisfied.

(a) All of the SINR, the RSSI, and the Successful ration of DL-MAP Receive become worse than the first thresholds mentioned above.

(b) All of the Tx_Power and the uplink modulation class become worse (lower) than the first thresholds mentioned above.

When the network to which the own terminal is connected is the third network 300, the preparation for the handover (Initiation Action) is performed if any of the following conditions is satisfied.

(a) All of the CIR and the PER become worse than the first thresholds mentioned above.

(b) The RSSI becomes worse (lower) than the first threshold mentioned above.

The second judgment logical formula is a condition (a second condition) for performing the execution for the handover (Execute Action). To be more precise, the second judgment logical formula indicates a combination of the thresholds to be satisfied by the multiple link parameters in the radio link established with the network to which the own terminal is connected.

Note that, in the first embodiment, the first judgment logical formula and the second judgment logical formula have the same combination of the thresholds to be satisfied by the link parameters. However, the invention is not limited to this configuration. Specifically, the combinations of the thresholds to be satisfied by the link parameters may be different between the first judgment logical formula and the second judgment logical formula.

The MIH user 14 is a mobility manager configured to manage mobility between the networks, in response to an instruction from the application processor 15 functioning as the upper layer than the MIH user 14. The MIH user 14 functions as the upper layer than the MIH function unit 13.

The application processor 15 functions as the upper layer than the MIH user 14 and processes various applications and the like.

(Operations of Communication System)

Figure 4:
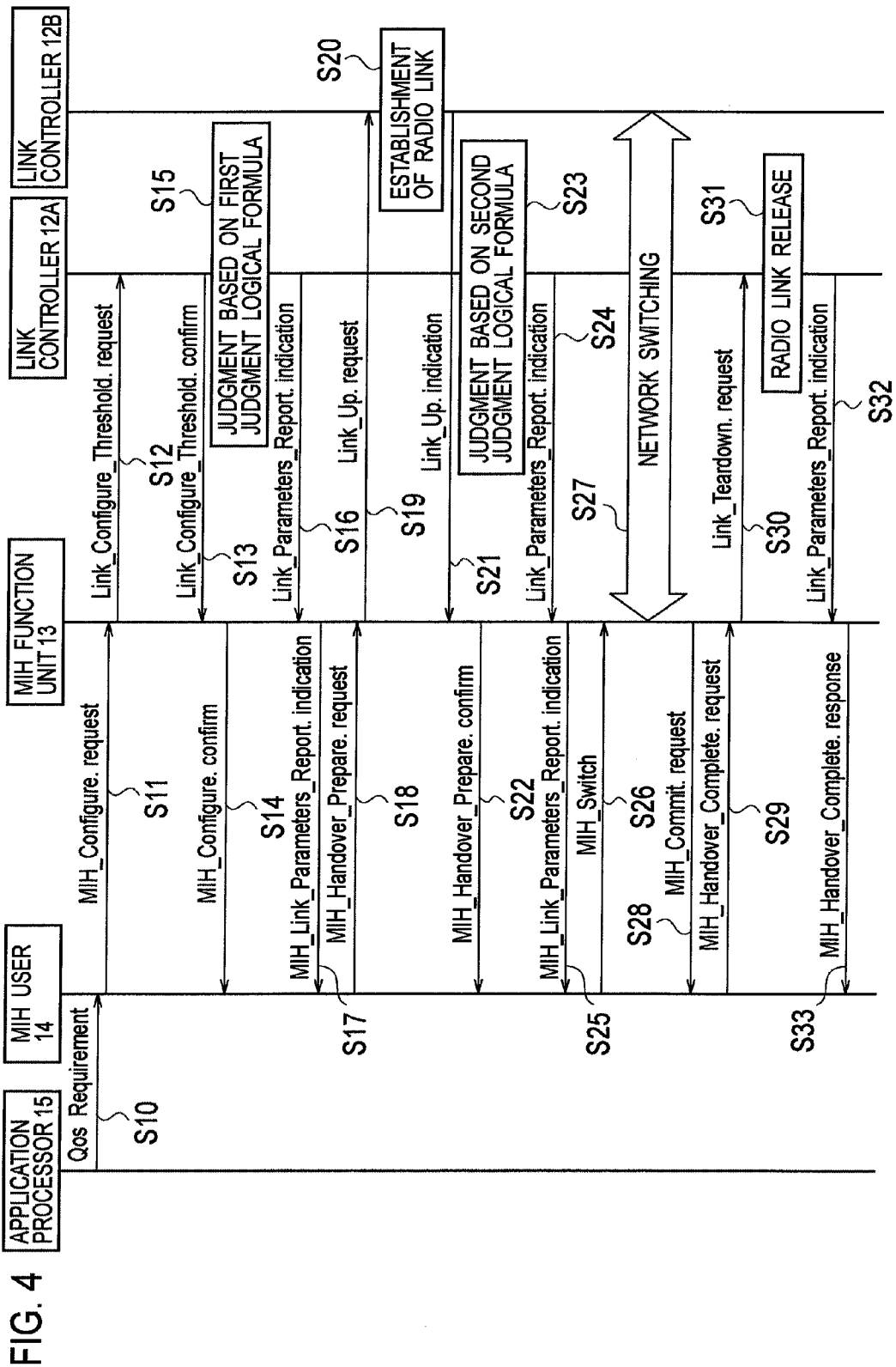
FIG. 4 is a sequence diagram showing operations of the communication system according to the first embodiment.

In the following, operations of the communication system according to the first embodiment will be described with reference to the accompanying drawings. FIG. 4 is a sequence diagram showing operations of the communication system according to the first embodiment. It is to be noted that FIG. 4 describes a handover operation from the first network 100 to the second network 200 as an example.

As shown in FIG. 4, in step 10, the application processor 15 notifies the MIH user 14 of service quality (QoS Requirement) required for a new application.

In step 11, the MIH user 14 notifies the MIH function unit 13 of a threshold setting request (MIH_Configure.request) that requests a setup of the thresholds of the link parameters to be monitored in the radio link established with the first network 100.

In step 12, the MIH function unit 13 notifies the link controller 12A of a condition setting request (Link_Configure_Threshold.request) that requests a setup of the condition concerning the handover from the first network 100 to the second network 200, in response to the threshold setting request (MIH_Configure_Threshold.request).

The condition setting request (Link_Configure_Threshold.request) at least includes the condition for performing the preparation for the handover (Initiation Action) (the first condition) and the condition for performing the execution for the handover (Execute Action) (the second condition).

To be more precise, as shown in FIG. 5, the condition setting request (Link_Configure_Threshold.request) at least includes the types of the link parameters, the first thresholds (Initiate Action Threshold), the second thresholds (Execute Action Threshold), the first judgment logical formula (Initiation Action), the second judgment logical formula (Execute Action), and a judgment cycle (Interval for judgment).

The judgment cycle (Interval for judgment) is information for designating an interval for judging whether or not the first judgment logical formula (Initiation Action) is satisfied and an interval for judging whether or not the second judgment logical formula (Execute Action) is satisfied.

Here, the interval for judging whether or not the first judgment logical formula is satisfied may be different from the interval for judging whether or not the second judgment logical formula is satisfied. Specifically, the judgment cycle (Interval for judgment) may individually designate the interval for judging whether or not the first judgment logical formula is satisfied and the interval for judging whether or not the second judgment logical formula is satisfied.

Meanwhile, the condition setting request (Link_Configure_Threshold.request) may also include a third threshold (Rollback Action Threshold). The third threshold (Rollback Action Threshold) is a threshold for judging whether or not to cancel the preparation for the handover (Initiation Action). Here, it is preferable to set up a value, which represents a situation where the radio environment becomes better than that of the first threshold (Initiate Action Threshold), as the third threshold in order to provide a hysteresis.

Here, it is to be noted that the first judgment logical formula (Initiation Action), the second judgment logical formula (Execute Action), and the judgment cycle (Interval for judgment) are not included in the Link_Configure_Threshold.request in the is related art.

In step 13, the link controller 12A notifies the MIH function unit 13 of Link_Configure_Threshold.confirm indicating that the setup of the condition is completed.

In step 14, the MIH function unit 13 notifies the MIH user 14 of MIH_Configure.confirm indicating that the setup of the thresholds is completed.

In step 15, the link controller 12A monitors whether or not the link parameter values in the radio link established with the first network 100 become worse than the first thresholds designated by the MIH function unit 13. Subsequently, the link controller 12A judges whether or not the respective link parameter values satisfy the first judgment logical formula. Here, the explanation will be continued based on the assumption that the first judgment logical value is satisfied.

In step 16, the link controller 12A notifies the MIH function unit 13 of Link_Parameters_Report.indication indicating the link parameter values in the radio link established with the first network 100.

To be more precise, as shown in FIG. 6, the Link_Parameters_Report.indication includes old link parameter values, new link parameter values, the operation type, and the judgment logical formula.

The old link parameter values are the values notified to the MIH function unit 13 in a previous session while the new link parameter values are the values to be notified to the MIH function unit 13 in a current session. The operation type is the information indicating any of the preparation for the handover (Initiation Action) and the execution for the handover (Execute Action). The judgment logical formula is the information indicating any of the first judgment logical formula (Initiation Action) and the second judgment logical formula (Execute Action).

Here, it is to be noted that the operation type and the judgment logical formula are the information not included in the Link_Parameters_Report.indication in the related art.

Note that, in step 16, the preparation for the handover (Initiation Action) is set up as the operation type and the first judgment logical formula (Initiation Action) is set up for the judgment logical formula.

In step 17, the MIH function unit 13 notifies the MIH user 14 of MIH_Link_Parameters_Report.indication showing the link parameter values in the radio link established with the first network 100.

In step 18, the MIH user 14 notifies the MIH function unit 13 of MIH_Handover_Prepare.request that requests the preparation for the handover (Initiation Action).

In step 19, the MIH function unit 13 notifies the link controller 12B of Link_Up.request that requests an establishment of the radio link with the second network 200.

In step 20, the link controller 12B sets up the radio link with the second network 200. Here, it is needless to say that the radio communication unit 11B sets up the physical radio connection with the second network 200 prior to the establishment of the radio link.

In step 21, the link controller 12B notifies the MIH function unit 13 of Link_Up.indication indicating that the radio link has been established with the second network 200.

In step 22, the MIH function unit 13 notifies the MIH user 14 of MIH_Handover_Prepare.confirm indicating that the preparation for the handover (Initiation Action) is completed.

In step 23, the link controller 12A monitors whether or not the link parameter values in the radio link established with the first network 100 become worse than the second thresholds designated by the MIH function unit 13. Subsequently, the link controller 12A judges whether or not the respective link parameter values satisfy the second judgment logical formula. Here, the explanation will be continued on the assumption that the second judgment logical formula is satisfied.

In step 24, the link controller 12A notifies the MIH function unit 13 of the Link_Parameters_Report.indication indicating the link parameter values in the radio link established with the first network 100. Here, the Link_Parameters_Report.indication is similar to the information is transmitted in step 16 described above.

Here, in step 24, the execution for the handover (Execute Action) is set up as the operation type and the second judgment logical formula (Execute Action) is set up for the judgment logical formula.

In step 25, the MIH function unit 13 notifies the MIH user 14 of the Link_Parameters_Report.indication indicating the link parameter values in the radio link established with the first network 100.

In step 26, the MIH user 14 notifies the MIH function unit 13 of MIH_Switch which indicates switching of the network to which the own terminal is connected.

In step 27, the MIH function unit 13 switches the network to which the own terminal is connected from the first network 100 to the second network 200.

In step 28, the MIH function unit 13 notifies the MIH user 14 of MIH_Handover_Commit.request for confirming whether or not to complete the handover.

In step 29, the MIH user 14 notifies the MIH function unit 13 of MIH_Handover_Complete.request which requests completion of the handover.

In step 30, the MIH function unit 13 notifies the link controller 12A of Link_Teardown.Request which requests release of the radio link established with the first network 100.

In step 31, the link controller 12A releases the radio network established with the first network 100.

In step 32, the link controller 12A notifies the MIH function unit 13 of the Link_Parameters_Report.indication indicating completion of the release of the radio link established with the first network 100.

In step 33, the MIH function unit 13 notifies the MIH user 14 of MIH_Handover_Complete.response indicating completion of the handover.

(Operation and Effect)

According to the first embodiment, the MIH function unit 13 notifies the link controller 12 of the Link_Configure_Threshold.request including the first judgment logical formula and the second judgment logical formula, which indicate the combinations of the thresholds to be satisfied by the multiple link parameters.

Therefore, the link controller does not have to notify the MIH function unit individually of the information indicating the link parameter values every time the respective link parameters exceed the thresholds, thereby reducing messages from the link controller 12A to the MIH function unit 13.

Moreover, since the link controller 12 grasps the combinations of the thresholds to be satisfied by the multiple link parameters, it is possible to perform a handover operation properly without depending upon transmission timing of the information indicating the link parameter values and thereby to suppress erroneous judgment of handovers.

Meanwhile, the reason for performing the judgment by use of the thresholds and the judgment logical formula is that it is not deemed preferable to judge everything merely by use of a single link parameter and a single threshold as a performance varies depending on the transmitter side (transmission from a radio base station or transmission from a radio terminal) in a radio communication system that employs different communication schemes between an uplink direction and a downlink direction. As described in this embodiment, it is possible to perform proper judgments accurately by judging the combinations of the thresholds for the multiple link parameters and the judgment logical formula.

[Other Embodiments]

As described above, the contents of the present invention have been described through an embodiment of the present invention. However, it is to be understood that the description and the drawings constituting part of this disclosure will not limit the present invention. It is obvious to those skilled in the art that various alternative embodiments are possible from this disclosure.

Although there are not specific remarks in the above-described embodiment, all or part of the radio communication units 11 may be rendered detachable from the radio terminal 10. Similarly, all or part of the link controllers 12 may be rendered detachable from the radio terminal 10 together with the radio communication units 11.

Here, a device configured to exclude the radio communication units 11 from the radio terminal 10 will be referred to as an information processing device. Similarly, a device configured to exclude the radio communication units 11 and the link controllers 12 from the radio terminal 10 will be referred to as an information processing device.

The operations of the ratio terminal 10 (or the information processing device) can also be provided as a program executable by a computer.

The above-described embodiment has explained the handover operation from the first network 100 to the second network 200 as the example. However, the present invention is not limited to this configuration. The present invention is applicable to handover operations between multiple networks employing different radio communication schemes.

As described above, it is needless to say that the present invention encompasses various embodiments which are not expressly stated herein. It is therefore to be understood that the technical scope of the present invention should be defined solely by the matters to define the invention in accordance with the appended claims which are deemed appropriate from the above description.

Industrial Applicability

As described above, a radio terminal, an information processing device, an information processing program, and an information processing method according to the present invention are capable of reducing messages from a link controller to a handover controller and suppressing erroneous judgment of handovers and are therefore useful in radio communication such as mobile telecommunication.

The invention claimed is:

1. A radio terminal configured to perform a handover from a first network to a second network employing a radio communication scheme different from that of the first network, comprising:
   at least one processor that comprises:
   a first link controller configured to establish a first radio link with the first network;
   a second link controller configured to establish a second radio link with the second network;
   a mobility manager configured to manage mobility from the first network to the second network; and
   a handover controller configured to control the handover from the first network to the second network, wherein
   the mobility manager, which is a layer above the handover controller, notifies the handover controller of a threshold setting request for requesting a set-up of a threshold for a link parameter to be monitored in the first radio link established with the first network,
   in response to the threshold setting request, the handover controller notifies the first link controller of a condition setting request including a first condition being a condition to start an establishment of the second radio link with the second network and a second condition being a condition to execute the handover from the first network to the second network,
   the first condition indicates a first combination of thresholds to be satisfied by a plurality of link parameters in the first radio link established with the first network,
   the second condition indicates a second combination of thresholds to be satisfied by the plurality of link parameters in the first radio link established with the first network, and
   the first link controller notifies the handover controller of information including an operation type when the first or second combination of thresholds is satisfied by a plurality of link parameters in the first radio link.

2. The radio terminal according to claim 1, wherein the condition setting request includes:
   a cycle for judging whether or not the first condition is satisfied; and
   a cycle for judging whether or not the second condition is satisfied.

3. The radio terminal according to claim 1, wherein the operation type comprises a preparation of handover or an execution of handover.

4. The radio terminal according to claim 1, wherein the first or second combination of thresholds are judgment logical formulas.

5. The radio terminal according to claim 1, wherein the condition setting request includes a judgment cycle, and the judgment cycle is an interval for judging whether or not the first or second combination of thresholds is satisfied by a plurality of link parameters in the first or second radio link.

6. The radio terminal according to claim 1, wherein the information includes a link parameter value in the first or second radio link.

7. An information processing device comprising:
at least one processor that comprises:
a mobility manager configured to manage mobility from a first network to a second network employing a radio communication scheme different from that of the first network; and
a handover controller configured to control a handover from the first network to the second network, wherein
the mobility manager, which is a layer above the handover controller, notifies the handover controller of a threshold setting request for requesting a set-up of a threshold for a link parameter to be monitored in a first radio link established with the first network,
in response to the threshold setting request, the handover controller notifies a first link controller configured to establish the first radio link with the first network, of a condition setting request including a first condition being a condition to start an establishment of a second radio link with the second network and a second condition being a condition to execute the handover from the first network to the second network,
the first condition indicates a first combination of thresholds to be satisfied by a plurality of link parameters in the first radio link established with the first network,
the second condition indicates a second combination of thresholds to be satisfied by the plurality of link parameters in the first radio link established with the first network, and
the first link controller notifies the handover controller of information including an operation type when the first or second combination of thresholds is satisfied by a plurality of link parameters in the first radio link.

8. An information processor configured to be used in an information processing apparatus provided with a mobility manager configured to manage mobility from a first network to a second network employing a radio communication scheme different from that of the first network, and a handover controller configured to control a handover from the first network to the second network, wherein the processor is configured to execute the steps of:
notifying, from the mobility manager, which is a layer above the handover controller, to the handover controller, a threshold setting request for requesting a set-up of a threshold for a link parameter to be monitored in a first radio link established with the first network; and
notifying, from the handover controller to a first link controller configured to establish the first radio link with the first network, a condition setting request including a first condition being a condition to start an establishment of a second radio link with the second network and a second condition being a condition to execute the handover from the first network to the second network, in response to the threshold setting request, wherein
the first condition indicates a first combination of thresholds to be satisfied by a plurality of link parameters in the first radio link established with the first network,
the second condition indicates a second combination of thresholds to be satisfied by the plurality of link parameters in the first radio link established with the first network, and
notifying the handover controller of information that includes an operation type when the first or second combination of thresholds is satisfied by a plurality of link parameters in the first radio link.

9. An information processing method used in an information processing device provided with an MIH user configured to manage mobility from a first network to a second network employing a radio communication scheme different from that of the first network, and an MIH function unit configured to control a handover from the first network to the second network, the information processing method comprising the steps of:
notifying, from the MIH user, which is a layer above the MIH function unit, to the MIH function unit, a MIH_Configure.request for requesting a set-up of a threshold for a link parameter to be monitored in a first radio link established with the first network; and
notifying, from the MIH function unit to a first link controller configured to establish the first radio link with the first network, a Link_Configure_Threshold.request including a first condition being a condition to start an establishment of a second radio link with the second network and a second condition being a condition to execute the handover from the first network to the second network, in response to the MIH_Configure.request, wherein
the first condition indicates a first combination of thresholds to be satisfied by a plurality of link parameters in the first radio link established with the first network,
the second condition indicates a second combination of thresholds to be satisfied by the plurality of link parameters in the first radio link established with the first network, and
notifying the MIH function unit of information that includes an operation type when the first or second combination of thresholds is satisfied by a plurality of link parameters in the first radio link.

* * * * *